(12) United States Patent
Komiyama et al.

(10) Patent No.: US 7,988,781 B2
(45) Date of Patent: Aug. 2, 2011

(54) NON-SETTLING REFRACTORY MORTAR

(75) Inventors: Tsuneo Komiyama, Toki (JP); Osamu Yamakawa, Kani (JP); Tetsuhiro Honjo, Mizunami (JP); Akito Higuchi, Kani (JP)

(73) Assignees: NGK Insulators, Ltd., Nagoya-Shi (JP); NGK Adrec Co., Ltd., Kani-Gun (JP)

( * ) Notice: Subject to any disclaimer, the term of this patent is extended or adjusted under 35 U.S.C. 154(b) by 703 days.

(21) Appl. No.: 12/034,936

(22) Filed: Feb. 21, 2008

(65) Prior Publication Data
US 2009/0145334 A1 Jun. 11, 2009

(30) Foreign Application Priority Data

Dec. 10, 2007 (JP) ................. 2007-317901

(51) Int. Cl.
C04B 12/04 (2006.01)
(52) U.S. Cl. .......... 106/600; 106/602; 501/88; 501/118; 501/127; 501/128
(58) Field of Classification Search .................. 106/600, 106/602; 501/88, 118, 127, 128
See application file for complete search history.

(56) References Cited

U.S. PATENT DOCUMENTS

| 4,517,037 | A | 5/1985 | Francis et al. |
| 6,548,435 | B1 | 4/2003 | Bugajski |
| 2006/0121240 | A1 | 6/2006 | Hirai et al. |

FOREIGN PATENT DOCUMENTS

| JP | 03-075275 A1 | 3/1991 |
| JP | 2004-231506 A1 | 8/2004 |

OTHER PUBLICATIONS

Orawan Srikumwong, "*Properties of Clay Used in Ceramic Industry*," Chemical Project, Department of Science Service, Aug. 2008.
W.E. Worrall, "*Clays and Ceramic Raw Materials*," The Rheology of Clay-Water Systems, 1986, pp. 135-136 and 143-144.
Preecha Pimkoukum, "*Ceramic Coating*," 1987, pp. 64-67.
W. Ryan, "*Properties of Ceramic Raw Materials*," 1978, 62-63.
Subrata Banerjee, "*Monolithic Refractories: A Comprehensive Handbook*," 1998, pp. 14-15, 19 and 21.
Stephen C. Carniglia et al., "*Handbook of Industrial Refractories Technology*," 1992, pp. 488-489.
F.H. Norton, "*Refractories*," 1968, p. 72.

*Primary Examiner* — Paul Marcantoni
(74) *Attorney, Agent, or Firm* — Burr & Brown

(57) ABSTRACT

A non-settling refractory mortar is provided, which includes 100 mass % of a ceramic powder such as cordierite, mullite, alumina, or silicon carbide, 0.5 to 1.5 mass % of a clay mineral, and a colloidal oxide solution, in which the Ca content in the total solid component is defined at 0.01 to 0.5 mass % as converted to oxide so as to be provided with a thixotropic property. As a result, the coating performance is not lowered if stored for a long period after kneading, the dimension change rate after coating is small, and cracks or gaps are not formed on the coat surface. The median diameter of ceramic powder is preferred to be 10 to 50 μm, and in order to reduce the dimension change rate after coating, the content of particles of 0.1 to 5 μm in ceramic powder is desired to be 1 to 20%.

6 Claims, 2 Drawing Sheets

NON-SETTLING REFRACTORY MORTAR

FIELD OF THE INVENTION

The present invention relates to a refractory mortar applied on ceramic surface or joint portions of furnace walls and fire bricks exposed to high temperature, and more particularly to a non-settling refractory mortar excellent in long-term storage and coating properties.

BACKGROUND OF THE INVENTION

Generally, mortar is a kneaded mixture of a powder material containing cement or lime, and water as solvent, and it makes use of a curing reaction by hydration reaction. Hence, usually it is mixed with water immediately before use and applied, and the working time is very short after kneading with water, and it is used immediately after kneading.

As shown in patent document 1, a cement-free mortar is known, which is applied on the surface of ceramic structure or the like. The mortar in patent document 1 is composed of fine ceramic particles, water as solvent, and silica sol, but when the time passes after kneading, ceramic particles settle, and the viscosity is elevated gradually, and the coating performance declines, and it has been needed to apply immediately after kneading with solvent.

The refractory mortar disclosed in patent document 2 is characterized by corrosion resistance expressed by the amount of magnesium hydroxide, but settling or viscosity changes occur with the lapse of time.

Thus, the existing mortar must be kneaded with the solvent immediately before use, and the kneading job at the site of coating is needed, and it cannot be stored for a long time, and the kneaded portion must be used up at the site. Moreover, the refractory mortar generally tends to shrink by drying or firing after application, form fine cracks on the coating surface, or cause gaps.

[Patent document 1] Japanese Patent Application Laid-Open No. 2004-231506

[Patent document 2] Japanese Patent Application Laid-Open No. 1991-75275

SUMMARY OF THE INVENTION

Problems to be Solved by the Invention

It is hence a primary object of the invention to solve the problems of the prior arts, and present a non-settling refractory mortar not lowered in coating properties if preserved for a long period after kneading with solvent, and not demanding kneading work at the site of coating. Other object of the invention is to present a non-settling refractory mortar small in dimension change rate when dried or fired after coating, and free from occurrence of crack or gap on the coated surface.

Means for Solving the Problems

The non-settling refractory mortar of the invention devised for solving the above problems includes 100 parts of ceramic powder, 0.5 to 1.5 parts of clay minerals, and a colloidal oxide solution, in which the Ca content in total solid content is 0.01 to 0.5% (mass %) as converted to oxide, so that thixotropic properties may be provided. Throughout the specification, the "parts" refers to parts by mass.

In the invention, preferably, the median diameter of ceramic powder is 10 to 50 μm. To reduce the dimension change rate after application, the content of particles of 0.1 to 5 μm in ceramic powder is preferred to be 1 to 20%.

The ceramic powder is preferred to be any one of cordierite, mullite, alumina, and silicon carbide.

The initial viscosity X (dPa.s) is 70 to 300, and when the 7-day later viscosity Y (dPa.s) is expressed in the formula $Y=AX+30$, A is preferred to be in a range of 0.7 to 0.9.

Further, the colloidal oxide solution is preferred to be silica sol or alumina sol.

Effects of the Invention

The non-settling refractory mortar of the invention is the same as the mortar in patent document 1 in that it includes ceramic powder and silica sol or colloidal oxide solution, but further includes 0.5 to 1.5 parts of clay minerals, and 0.01 to 0.5% of Ca content in total solid content as converted to oxide so as to have thixotropic properties, and therefore the fluidity is recovered immediately if shaken or agitated before use. Hence, the coating properties are not lowered if laid up for a long period after being kneaded.

The non-settling refractory mortar of the invention contains particles of 0.1 to 5 μm by 1 to 20% in the ceramic powder, and therefore the dimension change rate by drying or firing after coating may be lowered to smaller than 0.2%, and cracks or gaps are not formed on the coated surface.

DETAILED DESCRIPTION OF THE INVENTION

Figure 1:
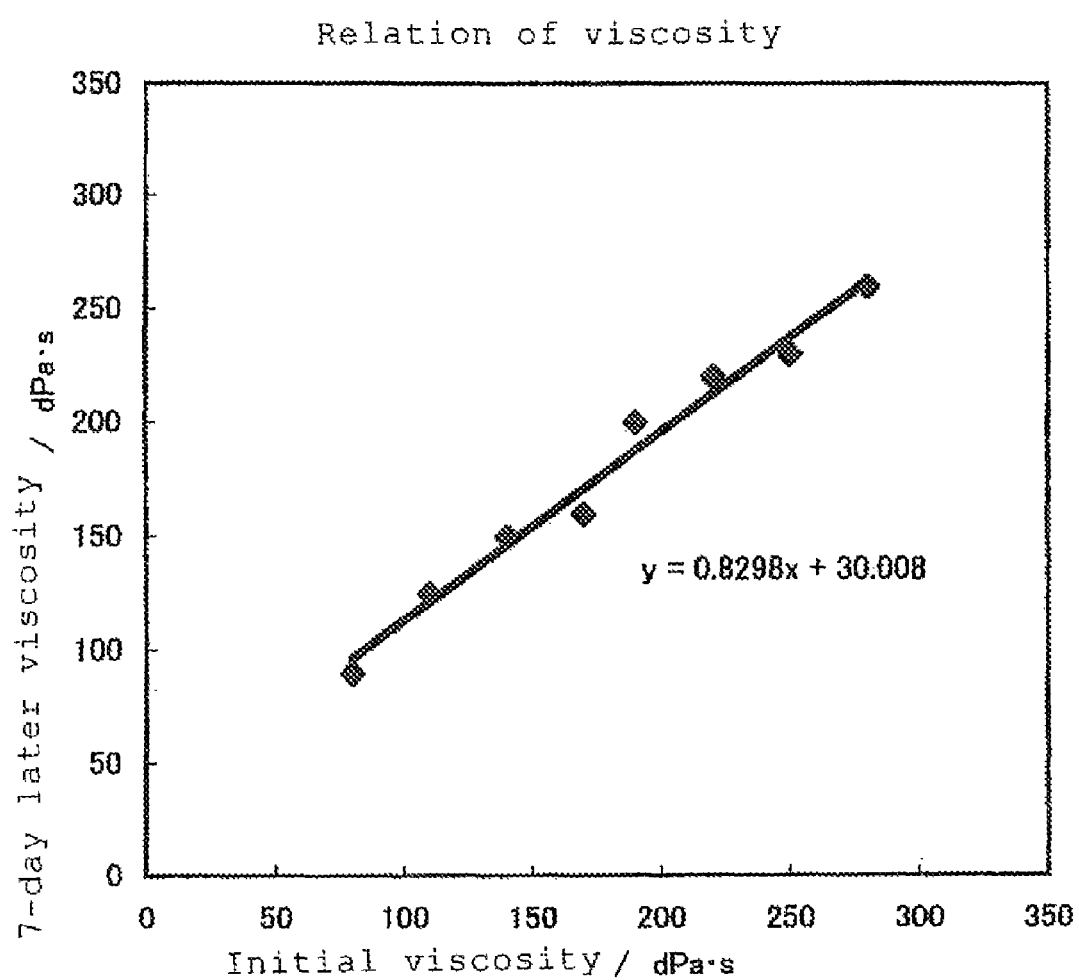
FIG. 1 is a graph showing time-course changes of viscosity of non-settling refractory mortar of the invention.

A preferred embodiment of the invention is specifically described below.

The non-settling refractory mortar of the invention is formed by kneading, basically, by adding colloidal oxide solution and water as solvent to ceramic powder. The ceramic powder is an essential component for expressing the heat resistance and strength, and is preferably selected from cordierite, mullite, alumina, and silicon carbide. When the refractory mortar of the invention is used as surface coating material of cordierite ceramic porous material, it is essential to select cordierite because it coincides in coefficient of thermal expansion.

The ceramic powder is used in a median diameter range of 10 to 50 μm. The median diameter is the particle size with which the powder amount is equal between the larger diameter side and the smaller diameter side when the powder is divided into two parts by particle size. When the median diameter is smaller than this range, the fluidity is poor, and too much solvent is needed, and the dimension change rate is increased, and cracks are likely to be formed on the coat surface. On the other hand, when the median diameter is larger than this range, the fluidity or coating performance after long-term storage is worsened. The measuring method of median diameter is specified in JIS R 1627-1997.

Thus, the non-settling refractory mortar of the invention is mainly composed of ceramic powder, not making use of hydration reaction of cement, and in order to express the binder function for binding the ceramic powder particles, a colloidal oxide solution such as silica sol is used. The silica sol is a viscous solution having silica fine particles suspended in water. It contains a moisture of about 30 to 90%, but it is kneaded by further adding water. The mixing ratio is 100 parts of ceramic powder and about 50 to 70 parts of silica sol+ water.

As a result, a refractory mortar mainly composed of ceramic powder is obtained, but long-term storage is not achieved in this state. Accordingly, the non-settling refractory mortar of the invention contains 0.5 to 1.5 parts of clay mineral, and also contains Ca by 0.01 to 0.5% as converted to oxide in the total solid content to be provided with thixotropic property. The clay mineral is magnesium aluminum silicate, and by adding 0.5 to 1.5 parts, sedimentation of ceramic powder is prevented, and the coating properties after storing for a long period may be enhanced.

In the invention, the Ca content in the total solid content is suppressed to traces of 0.01 to 0.5% as converted to oxide. It is hence not preferred to use natural material such as inexpensive clay. That is, when natural clay is used, the Ca content in the refractory mortar easily exceeds 1%. Naturally, the cement type refractory mortar contains CaO as an essential component, and, as a result, too much Ca is contained.

The thixotropic property is a characteristic of lowering in viscosity when a force is applied, and elevating in viscosity gradually when left over time, and the non-settling refractory mortar of the invention recovers a low viscosity promptly when agitated with an external force applied before use. Such thixotropic property is not exhibited in a refractory mortar having a high Ca content, and is not expected in the conventional refractory mortar exceeding 1% of Ca content. In the invention, since Ca is not mixed in except for clay mineral, and the Ca content may be controlled within a range of 0.01 to 0.5%.

The Ca content is defined in a range of 0.01 to 0.5% as converted to oxide because the thixotropic property is lowered in a higher range, and the material purity must be raised and it is not economical if less than 0.01% is demanded. The CaO content is measured according to JIS R 2212-1.

In addition, to enhance the strength, preferably, the refractory mortar of the invention may also contain 10 parts or less of ceramic fiber, or about 0.1 to 0.3 parts of organic or inorganic binder.

As described above, the non-settling refractory mortar of the invention is thixotropic, and aging effects of viscosity are suppressed if stored for a long period, and favorable coating properties may be obtained. That is, as set forth in claim 5, supposing the initial viscosity is X (dPa.s) and the 7-day later viscosity is Y (dPa.s), X is 70 to 300, and supposing Y=AX+30, the value of the gradient A is in a range of 0.7 to 0.9. In the conventional refractory mortar, the initial viscosity X is similar, but the value of gradient A is far over 1.

Figure 2:
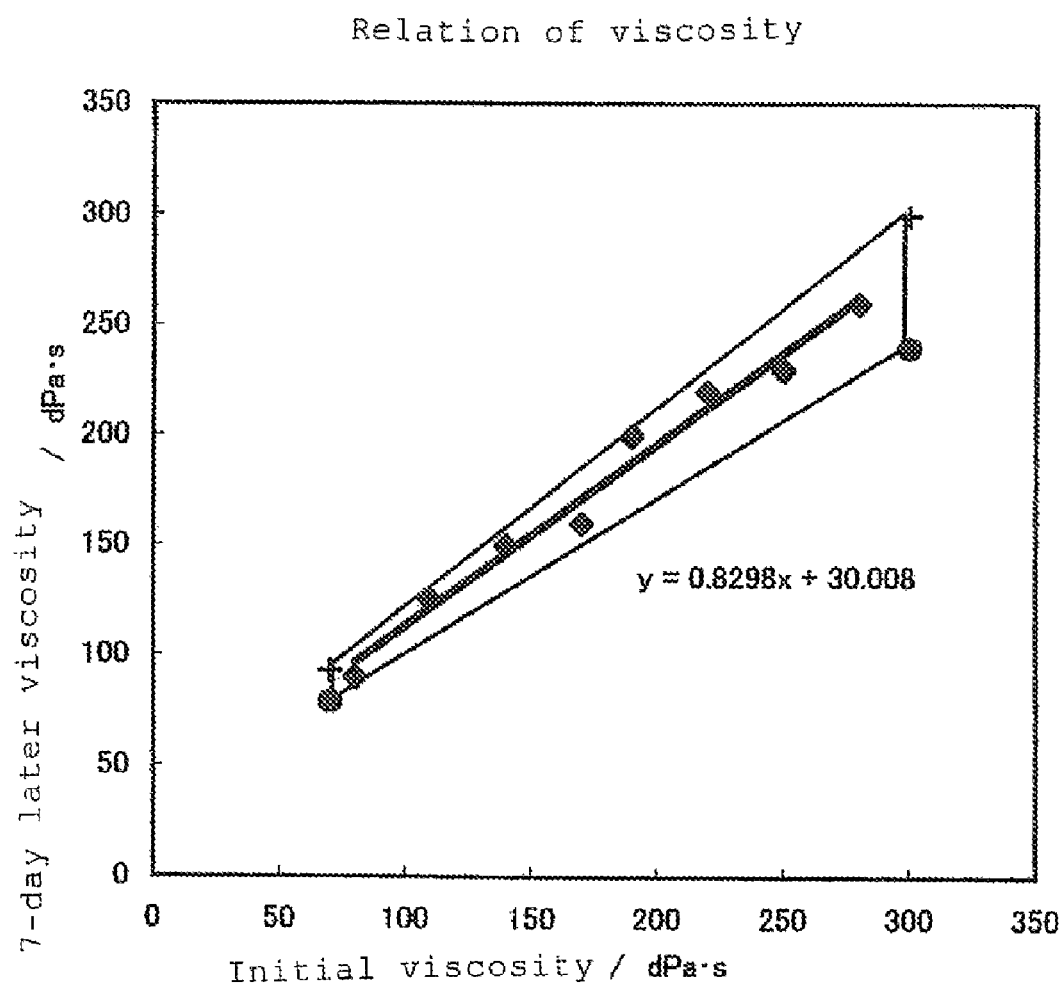
FIG. 2 is a graph showing the range in claim 5.

FIG. 1 and FIG. 2 are graphs showing this relationship, in which the axis of abscissas denotes the initial viscosity, and the axis of ordinates represents the 7-day later viscosity Y. The viscosity of the refractory mortar is measured by using, for example, a viscometer manufactured by RION (VT-04F), with No. 3 cup and No. 2 rotor, at temperature of 20° C. The enclosure in FIG. 2 shows the gradient A range of 0.7 to 0.9 as expressed in the formula Y=AX+30, and the refractory mortar out of this range is not in a proper range of viscosity for coating, for example, 6 months later, and favorable coating performance is not expected.

In this composition, the non-settling refractory mortar of the invention is not lowered in coating properties if stored for a long period after kneading with the solvent, and the on-site kneading job is not required. Further, in order to realize a smaller dimension change rate after coating and eliminate the risk of cracks or gaps on the coat surface, it is essential to reduce the fine powder amount in the principal component of ceramic powder.

Such fine power of ceramic has no function as a reinforcing material for preventing dimensional change, and to keep the dimension change rate after coating under 0.2%, the content of fine particles of 0.1 to 5 μm in ceramic powder is desired to be 1 to 20%. The dimension change rate after coating is measured according to JIS R 2207-1993, by heating the material dried at 110° C. to 1000° C., and measuring the dimension change. When the content of fine particles of 0.1 to 5 μm is 1 to 20%, if the median diameter is close to 10 μm, the dimension change rate is controlled under 0.2%. As a result, risk of forming cracks or gaps on the coat surface may be eliminated.

EXAMPLES

As shown in Table 1, in 100 parts of ceramic powder, 28 to 32 parts of silica sol or alumina sol, 0 to 7 parts of ceramic fiber, 0.1 to 0.2 parts of binder, and 27 to 30 parts of water were kneaded, and the initial viscosity X right after kneading, the 7-day later viscosity Y, the value of gradient A expressed in Y=AX+30, the coating performance when applied 6 months later, the dimension change rate up to 1000° C., and the number of cracks formed on the coat surface were measured, and results are shown in Table 1. The coating performance and the number of cracks formed on the coat surface were evaluated by applying the refractory mortar on the surface of cordierite ceramic porous material.

Examples out of the scope of the present invention are shown as comparative examples 1 to 4 in Table 2, as comparative examples 5 and 6, and as comparative examples 7 and 8. The viscosity was measured by using a viscometer of RION, the median diameter was measured according to JIS R 1627-1997, the content of CaO was measured according to JIS R 2212-1, and the dimension change rate after coating was measured according to JIS R 2207-1993.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Cordierite powder (mass %) | 100 | 100 | 100 | 100 | 100 | 100 | 100 | 100 | 100 |
| Mullite powder (mass %) | — | — | — | — | — | — | — | — | — |
| Alumina powder (mass %) | — | — | — | — | — | — | — | — | — |
| Silicon carbide powder (mass %) | — | — | — | — | — | — | — | — | — |
| Silica sol (mass %) | 30 | 30 | 30 | 30 | 30 | 32 | 28 | 30 | 30 |
| Alumina sol (mass %) | — | — | — | — | — | — | — | — | — |
| Ceramic fiber (mass %) | 5 | 5 | 5 | 5 | 5 | 7 | 5 | 0 | 5 |
| Binder (mass %) | 0.2 | 0.2 | 0.2 | 0.2 | 0.2 | 0.2 | 0.2 | 0.2 | 0.1 |
| Water (mass %) | 30 | 30 | 30 | 30 | 30 | 30 | 30 | 27 | 30 |
| Addition of clay mineral (mass %) | 1.0 | 1.0 | 1.0 | 1.0 | 0.5 | 1.5 | 1.0 | 1.0 | 1.0 |
| Content of CaO in mortar (mass %) | 0.01 | 0.1 | 0.3 | 0.5 | 0.3 | 0.3 | 0.3 | 0.3 | 0.3 |
| Median diameter of ceramic powder of main ingredient (μm) | 20 | 20 | 20 | 20 | 20 | 20 | 10 | 30 | 50 |
| Powder content of 0.1 to 5 μm particle size (mass %) | 10 | 10 | 10 | 10 | 10 | 10 | 10 | 10 | 10 |
| Initial viscosity (dPa · s) | 180 | 180 | 180 | 180 | 180 | 180 | 220 | 200 | 190 |

TABLE 1-continued

|  | | | | | | | | | |
|---|---|---|---|---|---|---|---|---|---|
| 7-day later viscosity (dPa · s) | 170 | 180 | 180 | 190 | 190 | 200 | 225 | 200 | 180 |
| Gradient A | 0.78 | 0.83 | 0.83 | 0.89 | 0.89 | 0.94 | 0.89 | 0.85 | 0.79 |
| Coating performance after 6 months | ○ | ○ | ○ | ○ | ○ | ○ | ○ | ○ | ○ |
| Dimension change rate up to 1000° C. (%) | 0.1 | 0.1 | 0.1 | 0.1 | 0.1 | 0.1 | 0.1 | 0.1 | 0.1 |
| Number of cracks on coat surface | 12 | 10 | 10 | 12 | 15 | 18 | 13 | 12 | 10 |

|  | Example 10 | Example 11 | Example 12 | Example 13 | Example 14 | Example 15 | Example 16 | Example 17 |
|---|---|---|---|---|---|---|---|---|
| Cordierite powder (mass %) | 100 | 100 | 100 | 100 | — | — | — | 100 |
| Mullite powder (mass %) | — | — | — | — | 100 | — | — | — |
| Alumina powder (mass %) | — | — | — | — | — | 100 | — | — |
| Silicon carbide powder (mass %) | — | — | — | — | — | — | 100 | — |
| Silica sol (mass %) | 30 | 30 | 30 | 30 | 30 | — | 30 | — |
| Alumina sol (mass %) | — | — | — | — | — | — | — | 30 |
| Ceramic fiber (mass %) | 5 | 5 | 5 | 5 | 5 | 5 | 5 | 7 |
| Binder (mass %) | 0.2 | 0.2 | 0.2 | 0.2 | 0.2 | 0.2 | 0.2 | 0.2 |
| Water (mass %) | 30 | 30 | 30 | 30 | 30 | 30 | 30 | 30 |
| Addition of clay mineral (mass %) | 1.0 | 1.0 | 1.0 | 1.0 | 1.0 | 1.0 | 1.0 | 1.5 |
| Content of CaO in mortar (mass %) | 0.1 | 0.1 | 0.1 | 0.1 | 0.3 | 0.3 | 0.3 | 0.3 |
| Median diameter of ceramic powder of main ingredient (μm) | 20 | 20 | 20 | 20 | 20 | 20 | 20 | 20 |
| Powder content of 0.1 to 5 μm particle size (mass %) | 1 | 5 | 15 | 20 | 10 | 12 | 15 | 10 |
| Initial viscosity (dPa · s) | 180 | 180 | 180 | 180 | 300 | 300 | 400 | 180 |
| 7-day later viscosity (dPa · s) | 170 | 180 | 180 | 180 | 300 | 290 | 380 | 190 |
| Gradient A | 0.78 | 0.83 | 0.83 | 0.83 | 0.90 | 0.87 | 0.88 | 0.94 |
| Coating performance after 6 months | ○ | ○ | ○ | ○ | ○ | ○ | ○ | ○ |
| Dimension change rate up to 1000° C. (%) | 0.2 | 0.12 | 0.05 | −0.2 | 0.1 | 0.1 | 0.1 | 0.1 |
| Number of cracks on coat surface | 12 | 12 | 10 | 20 | 18 | 20 | 15 | 20 |

TABLE 2

|  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|
| Cordierite powder (mass %) | 100 | 100 | 100 | 100 | 100 | 100 | 100 | 100 |
| Mullite powder (mass %) | — | — | — | — | — | — | — | — |
| Alumina powder (mass %) | — | — | — | — | — | — | — | — |
| Silicon carbide powder (mass %) | — | — | — | — | — | — | — | — |
| Silica sol (mass %) | 30 | 30 | 30 | 30 | 30 | 30 | 30 | 30 |
| Alumina sol (mass %) | — | — | — | — | — | — | — | — |
| Ceramic fiber (mass %) | 5 | 5 | 3 | 5 | 5 | 5 | 5 | 5 |
| Binder (mass %) | 0.2 | 0.2 | 0.2 | 0.2 | 0.2 | 0.2 | 0.2 | 0.2 |
| Water (mass %) | 30 | 30 | 29 | 30 | 30 | 30 | 30 | 30 |
| Addition of clay mineral (mass %) | 0.3 | 1.0 | 0.3 | 1.7 | 1.0 | 1.0 | 1.0 | 1.0 |
| Content of CaO in mortar (mass %) | 0.005 | 0.8 | 0.3 | 0.8 | 0.3 | 0.3 | 0.1 | 0.1 |
| Median diameter of ceramic powder of main ingredient (μm) | 20 | 20 | 20 | 5 | 5 | 70 | 20 | 20 |
| Powder content of 0.1 to 5 μm particle size (mass %) | 10 | 10 | 10 | 10 | 10 | 10 | 0.5 | 22 |
| Initial viscosity (dPa · s) | 180 | 180 | 180 | 250 | 250 | 180 | 180 | 180 |
| 7-day later viscosity (dPa · s) | 90 | 220 | 150 | 400 | 270 | 140 | 160 | 190 |
| Gradient A | 0.33 | 1.06 | 0.67 | 1.48 | 0.96 | 0.61 | 0.72 | 0.89 |
| Coating performance after 6 months | XX | X | Δ | XX | Δ | Δ | ○ | ○ |
| Dimension change rate up to 1000° C. (%) | 0.1 | 0.1 | 0.1 | 0.1 | 0.1 | 0.1 | 0.25 | −0.3 |
| Number of cracks on coat surface | 150 | 100 | 70 | 125 | 60 | 50 | 100 | 120 |

As shown in the data of the examples, the non-settling refractory mortar of the invention shows a small difference between the initial viscosity and the 7-day later viscosity, and the coating performance is excellent 6 months after kneading. The dimension change rate up to 1000° C. is small, and few cracks were formed on the coat surface. In contrast, in comparative examples 1 to 4, the coating performance at 6 months and the number of cracks formed on the coat surface were both poor, in comparative examples 5 and 6, the coating performance at 6 months and the number of cracks formed on the coat surface were both slightly poor, and in comparative examples 7 and 8, the coating performance at 6 months was favorable, but the number of cracks formed on the coat surface was poor.

The invention claimed is:

1. A non-settling refractory mortar comprising 100 mass % of a ceramic powder, 0.5 to 1.5 mass % of a clay mineral, and a colloidal oxide solution, wherein a Ca content in a total solid component is defined at 0.01 to 0.5 mass % as converted to an oxide so as to be provided with a thixotropic property.

2. The non-settling refractory mortar of claim 1, wherein a median diameter of the ceramic powder is 10 to 50 μm.

3. The non-settling refractory mortar of claim 2, wherein a content of particles in size of 0.1 to 5 μm in the ceramic powder is 1 to 20%.

4. The non-settling refractory mortar of claim 1, wherein the ceramic powder is any one of cordierite, mullite, alumina, and silicon carbide.

5. The non-settling refractory mortar of claim 1, wherein when an initial viscosity X (dPa.s) is 70 to 300, and a 7-day later viscosity Y (dPa.s) is expressed in Y=AX+30, wherein A is in a range of 0.7 to 0.9.

6. The non-settling refractory mortar of claim 1, wherein the colloidal oxide solution is either silica sol or alumina sol.

* * * * *